Jan. 7, 1969 E. G. GABBEY 3,419,928
METHOD OF MANUFACTURE OF ARTICLE WITH
SELF-LOCKING SCREW THREAD
Original Filed April 29, 1965
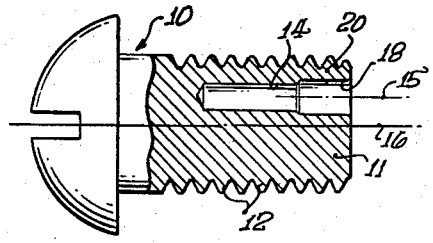
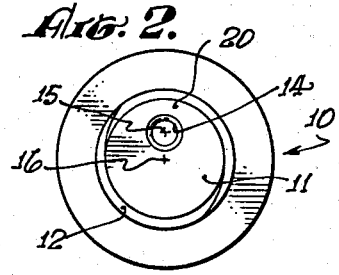
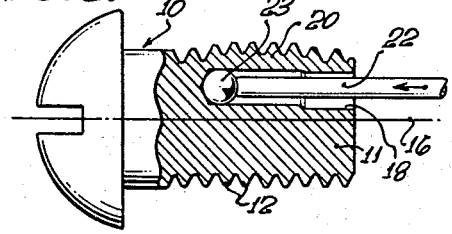
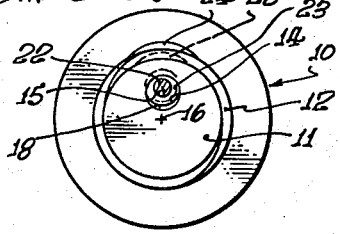
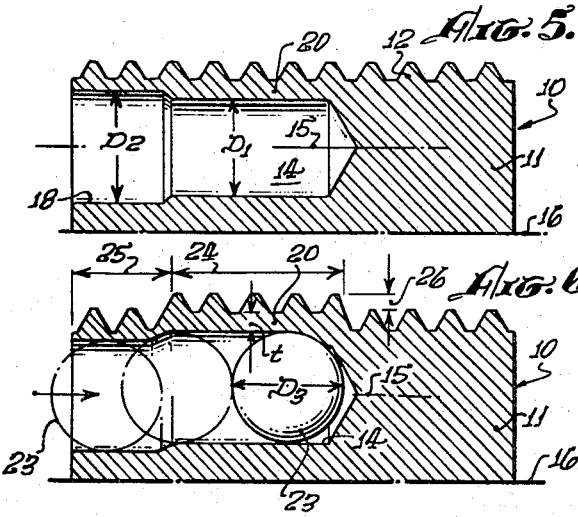
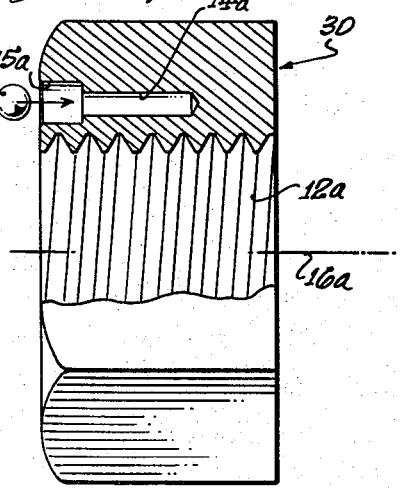
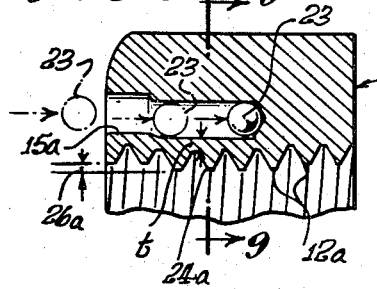
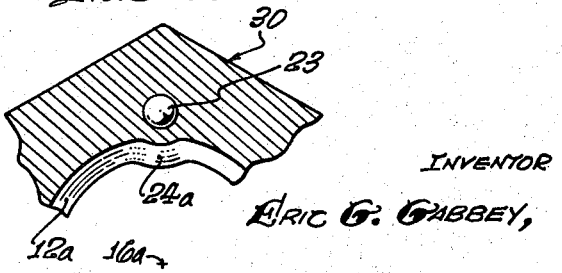
INVENTOR
ERIC G. GABBEY,
By Janowitz & Carr
ATTORNEYS

United States Patent Office 3,419,928
Patented Jan. 7, 1969

3,419,928
METHOD OF MANUFACTURE OF ARTICLE WITH SELF-LOCKING SCREW THREAD
Eric G. Gabbey, P.O. Box 43271,
Los Angeles, Calif. 90043
Original application Apr. 29, 1965, Ser. No. 451,784, now Patent No. 3,358,726, dated Dec. 5, 1967. Divided and this application Apr. 17, 1967, Ser. No. 631,445.
U.S. Cl. 10—10                              4 Claims
Int. Cl. F16b *39/28*

---

ABSTRACT OF THE DISCLOSURE

Typically, a bolt has a small bore parallel to but offset from the bolt axis to form a thin, deformable wall at the base of the thread at one side of the bolt. The thread is then expanded locally to increase the pitch diameter at the thin wall, providing additional holding power to resist vibration. The invention may also be applied to a nut having an internal thread.

---

This application is a division of my copending patent application Ser. No. 451,784, filed Apr. 29, 1965, for Article With Self-Locking Screw Thread and Method of Manufacture Thereof, now Patent No. 3,358,726.

The present invention relates generally to screw threaded articles such as nuts, bolts, and other types of fasteners, and more especially to such articles having a novel type of self-locking thread and to a method of making such a thread.

It has been discovered that under continued vibration, such as is encountered in airplanes, plain nuts and bolts become loosened by the vibration and, when the initial tension under which they are placed is released, they rapidly lose their holding power. One means used to resist this loosening under vibration is to provide a lock washer of some type or a gripping configuration on a bolt head. However, this has proved unsatisfactory under many circumstances for various reasons.

In order to meet this problem of resisting vibration, it has also become well known to add friction devices to the nut or bolt, this class of fasteners commonly being referred to as prevailing-torque type fasteners. These take such formations as an insert in the bolt or an elastic ring on the nut, such elements generally being made from nonmetallic materials, such as the synthetic resins or plastics. One serious limitation on the use of such devices is that the nonmetallic materials generally do not withstand high temperatures and, consequently, fail in their objective at elevated temperatures.

An ideal fastener having helical screw threads on it and designed to resist vibration should have several characteristics to the maximum possible degree. For example, it should resist vibration uniformly over a wide range of axial travel so that it does not tend to spin freely and loosen very rapidly after it has backed off slightly under the influence of vibration. It should also be reusable so that the same fastener can be removed and replaced a number of times without the necessity of using new ones each time the fastener is loosened.

Among other desirable characteristics of the ideal fastener are that it should be adapted to any manufacturer's product, therefore making it widely available for use; that it should comprise only a single piece so that there is no washer or separate member to become lost or require replacement; and also that it should be comparatively inexpensive to manufacture.

It is also highly desirable that a vibration-resistant fastener of this type be all metal, so that full advantage can be taken of modern high tensile strength alloys and that the fastener can resist, without any decrease in holding power, relatively high temperatures, for example in the area of 1,000° F. or even higher. These temperatures are now being encountered in actual practice in airplanes and missiles which fly at speeds greater than sonic speeds so that severe vibration is encountered along with relatively high temperatures.

Thus, it becomes a general object of the present invention to provide a vibration-resistant fastener having all of the above advantages in the maximum possible degree and yet which is simple, uncomplicated, and inexpensive to manufacture.

It is a more specific object of the present invention to provide a vibration-resistant fastener of this character which comprises an all-metal structure adapted to operate successfully under comparatively high ambient temperatures.

It is also an object of the present invention to provide a novel design for a vibration-resistant article having a helical screw thread in which the vibration-resistant features may be applied to either an internal or external thread.

The objects of the present invention are achieved by providing a fastener or similar article with a self-locking screw thread comprising a body of metal or other elastic material having a helical screw thread cut on the body, a portion of the screw thread being radially deformed so that it is noncircular, i.e., not of uniform radius, with respect to the axis of the remainder of the thread. Preferably, this zone of deformation is spaced from one end of the screw threads so that there is easy starting engagement at that end with mating threads but the vibration-resistant feature then comes into operation after the mating hreads have been engaged to a predetermined extent.

An article of this character is made by drilling a hole in the body of the threaded article adjacent to but eccentric with respect to the threads and then enlarging the diameter of the hole for at least a portion of its length in order to deform the screw threads locally to produce a section thereof that has the noncircular characteristic mentioned. The drilled hole is placed close enough to the screw threads that, by inserting a tool in the hole, the or slightly deformed. But, being elastic, this deformed wall between the hole and the threads can be stretched portion can, if necessary, be returned partway toward its original shape by engagement of the threads with a mating thread, yet still maintain a firm, vibration-resistant frictional engagement with the mating threads.

How the above objects and advantages of the invention, as well as others not specifically mentioned herein, are attained will be readily understood by reference to the following description and the annexed drawing, in which:

FIGURE 1 is a combined side elevation and longitudinal median section through a bolt having an external thread, showing one stage in the formation of the vibration-resistant construction;

FIGURE 2 is an end elevation of the bolt of FIGURE 1;

FIGURE 3 is a view similar to FIGURE 1 showing a later stage in the development of the vibration-resistant construction;

FIGURE 4 is an end elevation of the completed thread;

FIGURES 5 and 6 are enlarged fragmentary sections corresponding, respectively, to FIGURES 1 and 3;

FIGURE 7 is a combined side elevation and longitudinal section through a nut having an internal thread, illustrating the application thereto of the invention, one stage in the manufacture of the vibration-resistant construction being illustrated;

FIGURE 8 is a fragmentary section through the nut of FIGURE 7, showing a later stage in the development of the vibration-resistant structure; and FIGURE 9 is a fragmentary section through the nut of FIGURE 8 on line 9—9 thereof.

Referring now to the drawing, and more particularly to FIGURES 1 and 2, there is shown therein at an intermediate stage in the manufacture a typical screw-threaded bolt indicated generally at 10, having a cylindrical shank 11 on the outside of which are cut helical threads 12 which are here shown as being a standard V-thread, but it will be realized that the shape of the thread is in no way limitative upon the invention.

The structure of the completed article will be most readily understood by describing its manufacture. The first step is to drill in shank 11 a hole 14 which is eccentric with respect to the threads 12, the axis 15 of hole 14 being spaced from and parallel to the axis 16 of threads 12. Hole 14 is drilled from the end of the shank and is a blind hole, extending for any desired portion of threads 12. After the hole 14 is completed, it is counterbored at the outer end 18 to provide a section of slightly larger diameter. The completed hole is shown in greater detail in FIGURE 5, wherein the diameter of the original hole is $D_1$ and the diameter of the counterbore is $D_2$, $D_2$ being slightly larger than $D_1$ by an amount which will be determined by the material used, the diameter of the bolt, and other considerations.

Generally speaking, $D_1$ is made as small as is practical, in order to retain as much of the metal in the shank of the bolt as possible and thereby to retain the full strength of the bolt by minimizing the reduction in cross section. The spatial relationship between the axis of the drilled hole and the axis of the threads is selected so that there is between bore 14 and the roots of threads 12 a relatively thin wall indicated at 20 in FIGURE 5. The thickness of this wall at its minimum point will be determined by the designer according to the strength and other physical properties of the metal in bolt shank 11.

After hole 14 is counterbored as shown in FIGURE 5, a suitable expansion tool is inserted in the hole, the leading end of the tool being rounded. For practical reasons, the tool preferred is a shank 22 which pushes a round steel ball 23 to the bottom of hole 14; but the invention is not so limited and the shank 22 may have affixed to it a suitably shaped end portion. While it is preferred that the expanding portion of the tool is spherical, a tapered or conical end may be used on the tool instead, if desired. The diameter $D_3$ of the ball 23, or the equivalent dimension of the tool in a plane transverse to the axis of bore 14, is made substantially equal to or slightly less than $D_2$ in order that the tool passes freely through the counterbore 18 to the shoulder where the smaller diameter $D_1$ commences. However, the ball diameter $D_3$ is greater than $D_1$ and, consequently, the tool must be forced into the reduced portion of the bore 14 by the application of substantial pressure axially of shank 22.

For purposes of disclosure, the ball 23 will be considered as the operating portion of the tool. As ball 23 is forced into bore 14, the ball 23 acts to enlarge the diameter of the hole 14 to equal the diameter of the ball. It will be realized that the mass of metal radially inward from bore 14 is comparatively large and resists deformation, whereas the thickness of the wall at 20 is much smaller and is designed to yield to enlarge bore 14. Accordingly, as the tool is moved axially of bore 14, the wall at 20 is deformed outwardly, as shown enlarged in FIGURE 6, by stretching the metal in the wall since it it at this portion of the article that the resistance to enlargement of bore 14 is the least. The final shape of bore 14 is a hole of approximately uniform diameter throughout its length but with the inner end offset laterally from the outer counterbore 15. At the end of the operation, shank 22 is withdrawn, leaving ball 23 in place. This procedure eliminates any problems attendant on removing the ball.

The metal at wall 20 is now stretched beyond its elastic limit and so retains a permanent deformation. This deformation appears externally of the threaded shank as shown greatly exaggerated in FIGURES 3, 4 and 6, in which there is a zone 24 wherein the radius of the threads 12 has been enlarged locally. This enlargement is localized as seen clearly in FIGURE 4, and the threads at this point may be described as being noncircular with respect to axis 16, the axis of the remainder of the threads, since for a portion of each full turn the radius of each thread has been increased and, therefore, is not uniform for 360° around axis 16.

In ordinary circumstances, zone 24 is spaced from both ends of the threads 12, that is, from the ends of the threaded portion of shank 11. The spacing with respect to the end of the threads adjacent the head of the bolt is of no particular consequence and may be varied as desired, according to the length of the bolt. However, with respect to the opposite end of the bolt, which is the end that first enters the nut or mating thread on the part to which the bolt is attached, it is preferred that the deformed zone 24 be spaced from the end of the bolt by a distance 25 which is equal to about two full threads, or more specifically, the distance 25 equals about twice the lead of threads 12. Of course, a greater or smaller distance may be used if desired, the length being subject to various considerations.

This spacing being the deformed thread zone from the end of the bolt leaves about two full normal threads which permit easy normal starting engagement between the bolt and the nut or other article into which it is to be threaded. These two normal full threads allow the bolt to be started easily in a nut and to develop a good grip with mating threads on the nut before the deformed zone 24 enters the mating threads.

In order to make a full disclosure of a typical embodiment of the invention, certain exemplary dimensions will be given; but it is to be understood that these are merely typical and in on way limitative upon the invention, since all dimensions are subject to determination and selection based upon strength of the material used, its elastic limit, the diameter of the bolt, and various other physical characteristics. However, for a quarter-inch standard bolt, the thickness $t$ of wall 20 at the base of threads 12 may be typically .010 in., more or less. The diameter of bore 14 and the location of axis 15 are then selected so that the maximum increase in the radius of the threads as indicated at 26 in FIGURE 6 is approximately .005 inch, more or less. To accomplish this requires that the difference between $D_1$ and $D_3$ be approximately .005 inch.

The axial length of the deformation zone 24 is typically of the order of four or five threads but again this is subject to variation according to the judgment of the designer.

As the bolt constructed as described is threaded into a nut or other article, it will be appreciated that the enlargement of the diameter of the bolt threads in the zone 24 creates a tight fit between them and the mating threads on the nut which exerts a continuous, frictional grip upon the mating threads; and that this frictional grip is uniform regardless of the angular position of the bolt as long as one or more of its deformed threads are in engagement with a mating thread. The external pressure of the nut on threads 12 of the bolt may tend to return the enlarged or eccentric portion of the threads in the zone 24 to its original diameter. Ball 23 resists this external pressure; but elsewhere for the length of bore 14 some compression in zone 24 may occur; but, because of the elastic nature of the metal from which bolt 10 is made, the degree of restoration is less than the original deformation so that the deformed threads can continue to exert a frictional grip on the surrounding threads. That this is true has been demonstrated in actual practice by screwing home a bolt constructed as described, and then removing it from the nut; and repeating both operations several times. The friction between the bolt and the surrounding threads may be sufficiently great that it is advisable to provide the threads with some type of dry lubricant to reduce this friction. However, it has been found in actual practice that the bolt constructed as described can be reused a number of times, a sufficient number of times to meet the requirements of military specifications.

The elasticity of wall 20 also enables the bolt to hold firmly in mating threads within the full range of dimensions or normal manufacturing tolerances.

The invention has so far been described as applied to an article, for example a bolt, having an external thread; but the invention may be equally well applied to an article, for example a nut, having an internal thread. Such an article is illustrated in FIGURES 7, 8 and 9, in which the nut 30 is provided with an internal helical thread 12a having a central axis at 16a. The bore 14a and the counterbore 15a are made and located in the manner previously described and are subsequently enlarged by ball 23. The resultant enlargement of the bore deforms threads 12a over a zone 24a.

The only difference between applying the invention to an internal thread and to an external thread is that the radius of the threads is decreased as at 26a in the deformation zone 24a, rather than enlarged as previously described; but in each instance the threads may be described as being locally deformed to be no longer exactly circular or of uniform radius in the zone of deformation. Again, the zone of deformation is spaced from the ends of the threaded portion of the article, preferably being spaced by a distance equal to about twice the lead of the threads from the portion of the threads initially engaged with a mating thread, to provide for free starting.

From the foregoing description, it will be understood that various changes and modifications in the detailed construction of a self-locking thread and the manner of making it may occur to persons skilled in the art without departing from the spirit and scope of the present invention. Accordingly, it is to be understood that the above description is considered to be illustrative of, rather than limitative upon, the invention as defined by the appended claims.

I claim:
1. The method of making an article having self-locking screw threads that includes the steps of drilling a hole in the article adjacent but eccentric relative to the threads,
counterboring the hole at one end thereof to receive a tool,
and expanding the diameter of the inner portion of the hole to substantially the diameter of the tool but eccentric relative to the counterbore to alter the radius of the screw threads locally with respect to the original axis of the threads.

2. The method according to claim 1 in which the original axis of the bore and counterbore is substantially parallel to the original axis of the threads.

3. The method of making a self-locking thread on a metal article that includes the steps of
drilling a hole in the article adjacent the threads thereon, the axes of the hole and the threads being parallel but spaced apart,
counterboring the hole at one end,
and inserting a tool in the hole beyond the counterbore and stretching the metal between the hole and the threads beyond the elastic limit to deform the threads locally,
    said deformation of the threads being in a zone spaced from both ends of the threads.

4. The method of making a self-locking thread on a metal article that includes the steps of
drilling a hole in the article adjacent the threads thereon, the axes of the hole and the threads being parallel but spaced apart,
counterboring the hole at one end,
inserting in the hole a ball having a diameter no greater than the diameter of the counterbore and stretching the metal between the hole and the threads beyond the elastic limit to alter the radius of the threads locally,
and leaving said ball in said hole.

References Cited

UNITED STATES PATENTS 2,856,617  10/1958  Widmann _____ 10—10

FOREIGN PATENTS 8,475  6/1887  Great Britain.

LEONIDAS VLACHOS, *Primary Examiner.*

U.S. Cl. X.R.

10—27, 86; 151—22